March 11, 1958  A. MURDOCH, JR  2,826,396
VIBRATION PRODUCING APPARATUS
Filed Feb. 1, 1955  2 Sheets-Sheet 1

INVENTOR.
ALEXANDER MURDOCH, JR.
BY
Campbell, Brumbaugh, Free & Graves
his ATTORNEYS.

March 11, 1958  A. MURDOCH, JR  2,826,396
VIBRATION PRODUCING APPARATUS
Filed Feb. 1, 1955  2 Sheets-Sheet 2

INVENTOR.
ALEXANDER MURDOCH, JR
BY
his ATTORNEYS.

United States Patent Office 2,826,396
Patented Mar. 11, 1958

2,826,396
VIBRATION PRODUCING APPARATUS

Alexander Murdoch, Jr., Port Washington, N. Y., assignor to Telephonics Corporation, Huntington, N. Y., a corporation of New York Application February 1, 1955, Serial No. 487,189

7 Claims. (Cl. 259—72)

This invention relates to apparatus for producing compressional wave energy in the sonic and ultrasonic ranges, and more particularly to apparatus wherein vibrations are produced by changes in length of a magnetostrictive material resulting from magnetization by a high frequency electrical current.

The vibrations produced by such apparatus have been employed successfully in improving and accelerating cleaning operations, being of especial advantage in the cleaning of mechanical assemblies, including ball bearings and housings therefor, and sealed precision parts without injury to the parts and without requiring the disassembly thereof, as well as in other unrelated applications, such as in forming emulsions, mixing ordinarily immiscible compounds, homogenizing liquids, producing sintered metal from a plurality of pulverulent materials, and other applications well known in this art.

In one type of such apparatus disclosed in my copending application, Serial No. 404,225, filed January 15, 1954, a constant polarizing field is furnished to a vibrator unit, which comprises a laminated stack of plates formed of a magnetostrictive material, and a vibrating magnetic field of a frequency within the sonic or ultrasonic ranges is impressed upon the vibrator unit. The vibrations thus produced by the magnetostrictive material may be utilized in any desired manner, and in an embodiment of the invention disclosed therein, they are transmitted to a substance within a container.

One of the factors to be considered in the design of such equipment is overheating of the vibrator unit, and to prevent overheating, it is desirable that the unit be designed to operate at maximum efficiency, that eddy currents be reduced to a minimum, and that adequate provision be made for the dissipation of heat from the vibrator unit. The vibrator unit may, of course, be artifically cooled, such as by a blower or by a circulating refrigerant. However, such equipment adds to the cost, complexity and weight of the apparatus, and is impractical, except in larger installations.

The present invention provides a novel and unique vibrator apparatus of the general organization described above, wherein the vibrator unit comprises a plurality of individual elements of magnetostrictive material arranged side by side in closed array and presenting a hollow core or center. By virtue of this arrangement, the vibrator unit of the present invention is not only lighter in weight than conventional vibrator units, but, in addition, since both the inner and outer peripheries of the unit are exposed to the atmosphere, it affords a greater surface area for the dissiptation of heat. Moreover, because the tendency toward overheating is reduced, the size of the vibrating unit of the present invention may be greatly increased with the result that larger vibrating units may be employed in lieu of several smaller units of the conventional type.

In addition to affording a greater surface for the dissipation of heat, the hollow core of the vibrator unit of the present construction serves ideally to accommodate a magnet for furnishing the constant polarized field to the magnetostrictive elements of the vibrator unit. Thus, if a bar type magnet is employed and the magnet is arranged in parallel relationship to the magnetostrictive elements and concentrically within the hollow core, it is possible to insure that each of the elements of magnetostrictive material forming the vibrator unit will be subjected to a relatively uniform magnetic field.

Still another advantage of this arrangement of magnetostrictive elements is the increased rigidity and strength of the elements which make it less likely that the apparatus will be damaged.

These and other features of the present invention will be more fully understood by reference to the detailed description which follows and to the accompanying drawings in which.

Figure 1:
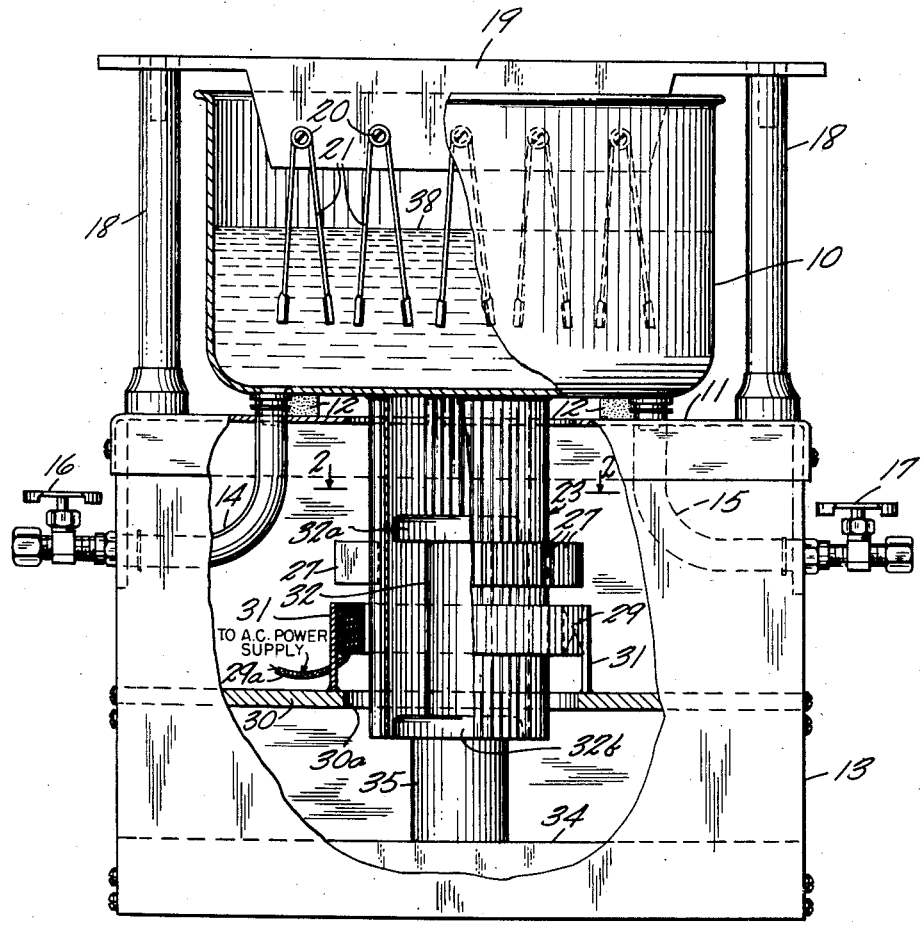
Fig. 1 is a view in elevation, partly in cross-section and partly broken away, of the apparatus embodying the present invention.

Referring to the drawings, and particularly to Fig. 1, a container 10 illustrated as being cylindrical in shape and having a flat bottom, is constructed from a corrosion resistant material, such as stainless steel. The container is supported above the upper surface 11 of a rectilinear housing 13 by cushion members 12 spaced between the surface 11 and the base of the container. By means of this support, vibrations impressed upon the container or the contents thereof will not be transmitted to the housing 13.

Two conduits 14 and 15 communicate with the interior of the container 10 through openings in the base thereof. One of these conduits may be connected to a liquid reservoir from which the liquid may be introduced into the container by pump or by gravity, and the other of the conduits may be connected to a waste line or receptacle for the discharge of fluid from the container. A valve 16 regulates the flow of liquid through the conduit 14, and a valve 17 regulates the flow of liquid through the conduit 15. If desired, for better drainage the bottom of the container may be sloped toward the outlet leading to the discharge conduit.

When used as an apparatus for cleaning objects, such as mechanical parts, the container may be partly filled with a suitable grease dissolving cleaning fluid 38 with the parts suspended from above the upper, open end of the container and immersed in the fluid. While any of various means may be employed for this purpose, the embodiment illustrated comprises a pair of upstanding posts 18 and a rack 19. The bases of the two vertical posts 18 are mounted to the platform 11, and their upper ends support the ends of the horizontal rack 19 above the container. The body of the rack 19 carries a number of pins or hooks 20 for the support of clamps 21 which straddle the pins or hooks, and the objects to be cleaned may be hung from the lower ends of the clamps 21 so as to be immersed in the liquid within the container.

Figure 2:
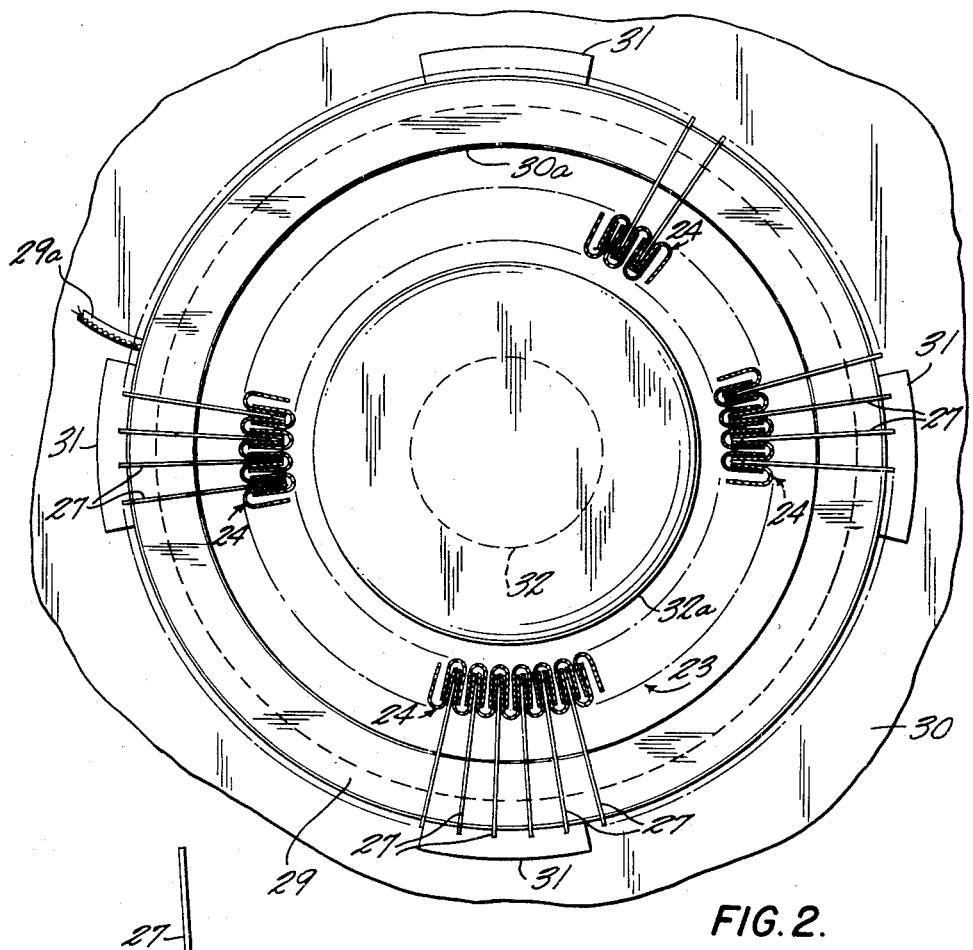
Fig. 2 is a cross section view taken on the line 2—2 of Fig. 1, looking in the direction of the arrows.
Figure 3:
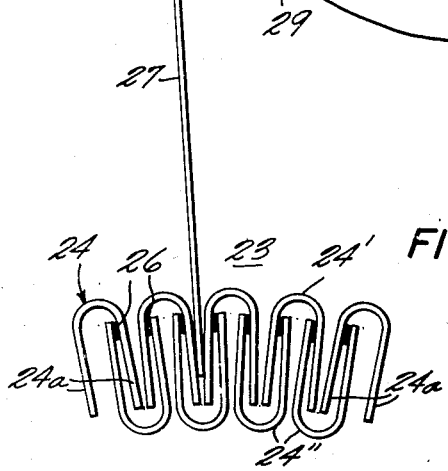
Fig. 3 is a greatly enlarged plan view illustrating the manner in which the elements of magnetostrictive material are connected to form the vibrator unit.

The upper end of a vibrator unit, generally designated by the reference character 23, is disposed more or less centrally beneath the base of the container and is attached thereto, preferably by a suitable bonding cement or adhesive. An opening is formed in the surface 11 to accommodate the vibrating unit. The vibrator unit 23, as best shown in Figs. 2 and 3, comprises a plurality of long, thin, linear strips or elements 24, preferably of one-half wavelength and made of grade A nickel or other magnetostrictive material, and each of the elements 24 is crimped or bent longitudinally in such fashion as to form a channel member of U-shaped cross-section.

The elements 24 are arranged in parallel relationship, although adjacent elements face in opposite directions so that each channel element serves to bridge or overlap portions of the channel elements on either side, that is to say, the leg portions 24a of each of the channel elements straddle one of the leg portions of each of the oppositely disposed elements on either side. The chain of elements thus connected are arranged in closed array, preferably a circular array, imparting a hollow cylindrical or tubular shape to the vibrator unit 23 with the elements 24' forming the outer periphery of the unit and the elements 24" forming the inner periphery thereof.

Although the resiliency of the individual channel elements may provide sufficient pressure to clip or hold them together as a unit, the adjacent elements are preferably bonded together by a suitable cement or adhesive 26 which, in addition to bonding the elements together, may also serve as an insulator between the elements to reduce eddy currents.

It is evident that the vibrator unit 23 of the present invention provides a high ratio of exposed surface area for the dissipation of heat to the atmosphere in comparison with the total weight of the unit, and as a result the tendency of the unit to overheat is greatly reduced. As mentioned above, heat may be dissipated both from the inner and outer peripheries of the unit, and the corrugated appearance of both peripheries increases the amount of exposed surface area. Furthermore, the elements 24 of which the unit is constructed are themselves formed of thin strips of magnetostrictive material, and, therefore, do not lend themselves to the retention of heat. The dissipation of heat from the unit 23 may be further aided by the fins 27 which project radially from the outer periphery of the vibrator unit 23. The fins 27 may be wedged between the elements 24', and if desired may be permanently anchored therein.

In order to energize the magnetostrictive vibrator unit 23, one or more coils 29 of an electrical conductor are positioned around the unit 23, and the terminal leads 29a of the coil are connected to an alternating or oscillating electrical power supply having a predetermined optimum frequency. The coil 29 is supported above an intermediate plate 30 of the housing 13 by brackets 31, whereby the coil 29 is supported out of contact with the outer periphery of the vibrator unit 23 so that the coil will not dampen or interfere with the vibrations of the said unit. The plate 30 is provided with an opening 30a to accommodate the lower end of the vibrator unit.

A permanent bar magnet 32 having pole heads 32a and 32b is accommodated within the hollow core of the vibrator unit 23, and the magnet is supported on one end above the floor 34 of the housing 13 by a base 35. It is to be understood that the unitary bar magnet 32 illustrated is exemplary only and other means of furnishing a polarizing magnetic field may be employed. It is believed, however, that the hollow vibrator unit of the present invention serves ideally to accommodate the permanent bar magnet, and due to its parallel disposition with respect to the magnetostrictive elements and its concentric position within the hollow core, a substantially uniform magnetic field will be furnished to all of the longitudinal elements 24 of the vibrator unit.

When the apparatus is employed for cleaning articles, it has been found preferable to fill and maintain the depth of the liquid 38 in the container 10 at a quarter wavelength or an odd multiple thereof of the wave energy generated by the vibrator unit 23 to provide for standing compressional waves in the liquid due to reflection from the surface thereof. However, it will be understood that this is not critical to the operation of the invention.

With the liquid at the desired level and the objects to be cleaned suspended from the clamps 21 of the rack 19 and thereby immersed in the liquid, the coil or coils 29 are energized through the conductors 29a from a suitable A. C. or other oscillating power supply (not shown) having an optimum predetermined frequency. For example, it has been found that frequencies of approximately 9 kilocycles to 30 kilocycles provide good cleaning efficiency with an optimum value being about 16 kilocycles. Upon energization of the coil 29, the well-known phenonema of magnetostrictive vibration will occur in the magnetostrictive elements 24, and the wave energy generated by changes in length of the elements will be transferred through the said elements and the bottom of the container 10 to the liquid 38 within the container and the articles to be cleaned. This elastic wave energy will cause each element of the article to be cleaned to expand and contract, without damage to the article, and thereby greatly assist the cleaning fluid in removing dirt, grease and other foreign substances found thereon. Where the object to be cleaned includes relatively movable parts, such as ball bearings, it has been found that the vibrations may slowly move the parts relative to each other, so that all of the movable surfaces are exposed to the cleaning fluid. This effect makes possible an exceptionally thorough cleaning action.

From the aforegoing description it will be apparent that the present invention provides a vibrator unit based on principles of magnetostriction of exceptional efficiency and embodying maximum utilization of the energy produced, and such additional features of design, as light weight, simplicity and compactness. Moreover, the structure of the vibrator unit of the present invention offers a high proportion of exposed surface area from which heat produced within the longitudinal elements of the vibrator unit may be readily dissipated by circulating air or other fluid.

The words "bent," "crimped" or the like as used herein in the description of the shape of the magnetostrictive elements are not intended necessarily to imply any mechanical bending, shaping or forming process which would be excluded the molding of the elements in the prescribed shape initially.

The present invention has been shown and described in a single preferred form and by way of example only, and obviously many modifications and variations may be made therein within the spirit of the invention. The invention is, therefore, not to be limited to any specified form or embodiment, except insofar as such limitations are set forth in the appended claims.

I claim:

1. Vibration producing apparatus comprising a plurality of parallel elements of magnetostrictive material clustered together in closed array about a hollow center and insulated from one another, said elements being crimped in a direction substantially parallel with the hollow center defined by said array, forming a series of substantially parallel corrugations in the inner and outer boundaries of the closed array, the distance separating the inner boundary and the outer boundary of the closed array being less than the length of the edges of the elements defining the ends of the closed array, and means for impressing a vibrating magnetic field on said elements.

2. Vibration producing apparatus comprising a plurality of elements of magnetostrictive material arranged in closed array about a hollow center, certain of said elements being crimped longitudinally and having both longitudinal edges disposed inwardly toward the hollow center, other of said elements being crimped longitudinally and having both longitudinal edges disposed outwardly from the hollow center, and means for impressing a vibrating magnetic field on said magnetostrictive elements.

3. A vibration producing apparatus comprising a plurality of longitudinally crimped elements of magnetostrictive material arranged in a closed array about a hollow center, said elements being insulated one from another, the inner boundary of the closed array of magnetostrictive elements being formed by the surfaces of the elements which have their opposite longitudinal edges disposed outwardly from the hollow center, and the outer boundary of the closed array of magnetostrictive elements being formed by the surfaces of the elements which have their opposite longitudinal edges disposed inwardly toward the hollow center, and means for impressing a vibrating magnetic field on said magnetostrictive elements.

4. Vibration producing apparatus comprising a plurality of thin elements of magnetostrictive material arranged in circular array about a hollow center, said elements being longer than they are wide, means disposed internally within said hollow center for producing a constant polarizing magnetic field, said elements of said array being crimped longitudinally so that the distance between the portions of the magnetostrictive elements which form the inner and outer peripheries of the circular array is less than the widths of said magnetostrictive elements, thereby avoiding a substantial flux gradient across the width of the elements, and means for impressing a vibrating magnetic field on said elements.

5. Vibration producing apparatus comprising a plurality of long, thin elements of magnetostrictive material insulated from each other and connected one to another in a closed circular array about a hollow center, certain of said elements being crimped longitudinally and having both opposite longitudinal edges disposed inwardly toward the hollow center of the array, other of said elements being crimped longitudinally and having both opposite longitudinal edges disposed outwardly from the hollow center of the array, means for producing a constant polarizing field having a component longitudinally of said elements, and means for producing a vibrating field which is impressed on said polarized field.

6. Vibration producing apparatus comprising a container, a resilient support for the container, a plurality of elements of magnetostrictive material affixed at their ends to the container, said plurality of elements being insulated from each other and arranged in a circular array about a hollow center, said elements being longer than they are wide and each being crimped longitudinally, whereby the distance between the inner and outer peripheries of the circular array of elements is less than the widths of the elements, means disposed within said hollow center for impressing a substantially uniform polarizing magnetic field on all of said elements, means for supporting said means independently of the container and the magnetostrictive elements affixed thereto, and means for impressing a substantially uniform vibrating magnetic field on all of said elements.

7. Vibration producing apparatus comprising a container, a resilient support for the container, a plurality of elements of magnetostrictive material affixed at their upper ends to the underside of the container, said plurality of elements being insulated from each other and arranged in a circular array about a hollow center, the inner periphery of the circular array of magnetostrictive elements being formed by the surfaces of elements which have their opposite longitudinal edges disposed outwardly from the hollow center and the outer periphery of the circular array of magnetostrictive elements being formed by the surfaces of elements which have their opposite longitudinal edges disposed inwardly toward the hollow center, a magnetic body disposed substantially concentrically within said hollow center producing a constant polarizing field, means for supporting said magnetic body independently of the container and said circular array of magnetostrictive elements, an electrical coil disposed substantially concentrically around said circular array of magnetostrictive elements energized by a vibrating power supply, and means for supporting said electrical coil independently of the container and said circular array of magnetostrictive elements.

References Cited in the file of this patent

UNITED STATES PATENTS

| | | |
|---|---|---|
| 1,568,727 | Frank | Jan. 5, 1926 |
| 1,881,610 | Hyde | Oct. 11, 1932 |
| 2,076,330 | Wood et al. | Apr. 6, 1937 |
| 2,107,031 | Evans | Feb. 1, 1938 |
| 2,116,522 | Kunze | May 10, 1938 |
| 2,166,359 | Lakatos | July 18, 1939 |
| 2,247,978 | Van Arkel | July 1, 1941 |
| 2,405,317 | McCollum | Aug. 6, 1946 |
| 2,419,233 | Spender | Apr. 22, 1947 |
| 2,468,550 | Fruth | Apr. 26, 1949 |
| 2,498,990 | Frykland | Feb. 28, 1950 |
| 2,596,226 | Eldridge | May 13, 1952 |

FOREIGN PATENTS

| | | |
|---|---|---|
| 858,334 | France | May 6, 1940 |